United States Patent [19]

Murata et al.

[11] Patent Number: 5,568,291
[45] Date of Patent: Oct. 22, 1996

[54] ELECTRODE SUBSTRATE WITH LIGHT SHIELDING FILM HAVING UPPER SURFACE COPLANAR WITH UPPER SURFACE OF LAMINATE ELECTRODES

[75] Inventors: Tatsuo Murata, Hiratsuka; Kazuya Ishiwata, Yokosuka; Toshifumi Yoshioka, Hiratsuka, all of Japan

[73] Assignee: Cannon Kabushiki Kaisha, Tokyo, Japan

[21] Appl. No.: 296,180

[22] Filed: Aug. 29, 1994

Related U.S. Application Data

[60] Continuation of Ser. No. 991,404, Dec. 16, 1992, abandoned, which is a division of Ser. No. 660,861, Feb. 26, 1991, Pat. No. 5,348,828.

[30] Foreign Application Priority Data

Feb. 26, 1990 [JP] Japan ................... 2-042613

[51] Int. Cl.$^6$ .................. G02F 1/1333; G02F 1/1343
[52] U.S. Cl. .................. 359/67; 359/82; 359/87
[58] Field of Search .................. 359/67, 54, 56, 359/87, 68, 82, 100; 430/5, 7, 20; 428/1

[56] References Cited

U.S. PATENT DOCUMENTS

| | | | |
|---|---|---|---|
| 2,367,660 | 1/1945 | Agre | 204/158 |
| 2,367,670 | 1/1945 | Christ | 154/2 |
| 2,722,512 | 11/1955 | Crandell | 204/158 |
| 3,619,601 | 11/1971 | Guth et al. | 430/306 |
| 4,367,924 | 1/1983 | Clark et al. | 350/334 |
| 4,579,812 | 4/1986 | Bower | 430/313 |
| 4,778,747 | 10/1988 | Ohta et al. | 430/321 |
| 4,837,098 | 6/1989 | Shimomura et al. | 430/7 |
| 4,859,036 | 8/1989 | Yamanaka et al. | 359/87 |
| 4,913,674 | 4/1990 | Nicholas | 430/319 |
| 4,948,706 | 8/1990 | Sugihara et al. | 430/20 |
| 5,000,545 | 3/1991 | Yoshioka et al. | 359/87 |
| 5,120,623 | 6/1992 | Brosig et al. | 359/67 |
| 5,128,786 | 7/1992 | Yanagisawa | 359/67 |
| 5,132,816 | 7/1992 | Itoh et al. | 359/56 |
| 5,138,473 | 8/1992 | Dijon et al. | 359/67 |
| 5,161,043 | 11/1992 | Narutaki et al. | 359/67 |
| 5,187,601 | 2/1993 | Yamazaki et al. | 359/87 |
| 5,278,009 | 1/1994 | Iida et al. | 359/68 |
| 5,348,828 | 9/1994 | Murata et al. | 430/20 |
| 5,461,494 | 10/1995 | Sekimura et al. | 359/67 |

FOREIGN PATENT DOCUMENTS

5040317  12/1975  Japan .

*Primary Examiner*—William L. Sikes
*Assistant Examiner*—Tai V. Duong
*Attorney, Agent, or Firm*—Fitzpatrick, Cella, Harper & Scinto

[57] ABSTRACT

A process for producing an electrode substrate for use in a liquid crystal device in which a laminate film comprised of a transparent conductive film and a metal film is formed of a first side of a transparent substrate. The laminate film is pattern-etched so as to form islands of the laminate film in a predetermined pattern. A photosensitive anaerobic colored resin is applied on the transparent substrate on which the islands of laminate film are arranged in the predetermined pattern. The transparent substrate is uniformly exposed to a light from a second side of the substrate opposite to the first side in an oxygen-containing atmosphere. Unexposed portions of the photosensitive anaerobic resin are removed so as to leave the photosensitive anaerobic resin only in the spaces between adjacent islands of the laminate film, for forming a light-shielding film in each of the spaces. The metal film of each laminate film island is etched so as to remove unnecessary portions of the metal film, thereby forming metal electrodes wired along edges of the transparent conductive film.

6 Claims, 4 Drawing Sheets

ELECTRODE SUBSTRATE WITH LIGHT SHIELDING FILM HAVING UPPER SURFACE COPLANAR WITH UPPER SURFACE OF LAMINATE ELECTRODES

This application is a continuation of application Ser. No. 07/991,404, filed Dec. 16, 1992, now abandoned, which is a division of application Ser. No. 07/660,861, filed Feb. 2, 1991, now U.S. Pat. No. 5,348,828.

BACKGROUND OF THE INVENTION

1. Field of the Invention

The present invention relates to a process for producing an electrode substrate having a light shielding film, suitable for use in liquid-crystal devices such as a liquid-crystal display device and a liquid crystal-optical shutter device. More particularly, the present invention relates to a process for producing an electrode substrate with a light shielding film which is placed between pixels of a liquid crystal display device or in areas other than a window of a liquid crystal-optical shutter device.

2. Description of the Related Art

Hitherto, liquid crystal devices have been known which utilize twisted nematic liquid crystal of the type disclosed in "Voltage-Dependant Optical Activity of a Twisted Nematic Liquid Crystal" by M. Schadt and W. Helfrich, in "Applied Physics Letters" Vol. 18. No. 4, pp 127–128.

In this type of liquid crystal device, the number of pixels is undesirably limited due to the fact that the twisted nematic liquid crystal tends to allow crosstalk when driven by a multiplexing process with a matrix-type electrode structure having a high pixel density.

A display device also has been known in which switching elements composed of thin-film transistors are connected to the respective pixels so as to enable switching of the pixels independently. This type of display device, however, requires quite a complicated process for forming such thin-film transistors on a substrate. In addition, it is difficult to produce a display device of this type with a large display area.

In order to overcome this problem, a ferroelectric liquid crystal device has been proposed by Clark et al. in the specification of U.S. Pat. No. 4,367,924.

FIG. 3 schematically shows an example of a liquid crystal cell for the purpose of illustration of an operation of the ferroelectric liquid crystal. Referring to this Figure, numerals 21a and 21b show substrates covered by transparent electrodes composed of transparent conductive thin films such as $In_2O_3$, $SnO_2$ or ITO (Indium-Tin Oxide). The space between these substrates 21a, 21b is filled with a liquid crystal of SmC* phase or SmH* phase oriented such that a plurality of liquid crystal molecule layers 22 are perpendicular to the substrates. Thick lines 23 in this Figure show liquid crystal molecules. The liquid crystal molecule 23 has a bipolar moment (P⊥) 24 in the direction perpendicular to the molecule. When a voltage exceeding a predetermined threshold value is applied between the electrodes on the substrates 21a and 21b, the spiral arrangement of the liquid crystal molecules 23 is loosened so that the orientation of the liquid crystal molecules 23 can be changed such that the bipolar moments (P⊥) 24 of all the molecules are aligned in the direction of the electric field. The liquid crystal molecule has an elongated form so as to exhibit a refractive anisotropy, i.e., different refractive index values in the directions of longer and shorter axes. It is therefore easy to understand that a liquid crystal optical modulation device, which varies its optical characteristics depending on the polarity of the voltage applied, can be obtained by disposing polarizers on the outer sides of both glass substrates in a cross-conical relationship to each other.

Liquid crystal cells suitably used in the ferroelectric liquid crystal device can be very thin, e.g., 10μ or less. As the thickness becomes smaller, the spiral arrangement of the liquid crystal molecules becomes loose even in the absence of an electric field, with the result that the liquid crystal molecules are oriented to direct their bipolar moments upward (Pa) as denoted by 34a or downward (Pb) as denoted by 34b, as will be seen from FIG. 4. When either an electric field Ea, stronger than a predetermined threshold, or an electric field Eb, having the opposite polarity, is applied to this cell, the bipolar moments of the liquid crystal molecules are oriented upward as 34a or downward as 34b depending on the vector of the electric field Ea or Eb, whereby the liquid crystal molecules are set either to a first stable state 33a or a second stable state 33b.

As explained before, the ferroelectric liquid crystal device as an optical modulating element offers two major advantages: namely, an extremely high response speed and bi-stability of liquid crystal molecule orientation.

The second advantage, namely, the bi-stability of the ferroelectric liquid crystal device, will be described in more detail with reference to FIG. 4. The liquid crystal molecules are oriented to the first stable state 33a when an electric field Ea is applied. This state is stably maintained even after extinction of the electric field. When the electric field Eb of the opposite polarity is applied, the liquid crystal molecules are oriented to the second stable state 33b. This state also is maintained even after extinction of the electric field Eb. In addition, each stable state is maintained without being inverted even by application of an electric field Ea or Eb of the opposite polarity, unless the magnitude of the electric field applied exceeds the predetermined threshold. In order to realize the high response speed and bi-stable nature as described, the cell thickness should be made as small as possible.

In order that the ferroelectric liquid crystal device exhibits the expected driving characteristic, it is necessary that the molecules of the ferroelectric liquid crystal, interposed between the pair of parallel substrates are arranged to allow an easy switching between the two stable states. For instance, in the case of a ferroelectric liquid crystal having chiral smectic phase, it is necessary that a mono-domain is formed in which the liquid crystal molecule layers of chiral smectic phase are perpendicular to the substrate surfaces and, hence, the axes of the liquid crystal molecules are substantially parallel to the substrate surfaces. However, a liquid crystal orientation having a mono-domain structure could not be satisfactorily obtained in the conventional ferroelectric liquid crystal device, making it impossible to attain a desired characteristic of the liquid crystal device.

In the production of a panel making use of such liquid crystals, it is conventional to form a light-shielding film between pixels, for the purpose of enhancing contrast. Practically, such a light-shielding film is formed by a process having the steps of spin-coating a photosensitive anaerobic colored resin and covering the resin with a polyvinyl film as an oxygen shielding film, followed by exposure and development.

It has also been attempted to enhance the contrast by forming a metal light-shielding film.

These known processes of producing electrode substrates, however, suffer from the following disadvantages. In an ordinary ferroelectric chiral smectic liquid crystal panel, a step of about 4000 Å is formed due to the presence of a laminate composed of an ITO transparent conductive film of about 2500 Å thick and a molybdenum metal film of about 1500 Å thick. Therefore, the light-shielding film which is to be formed between adjacent islands of the laminate has to have a very small thickness of about 4000 Å. Actually, however, it is impossible to apply a resin by spin-coating in a thickness less than 1 μm, so that thin light-shielding film having such a very small thickness of 4000 Å or so is materially not obtainable.

It has been attempted to spin-coat the resin of the light-shielding film material with a thickness of 4000 Å or so by adjusting the density of the resin. It has been reported that, when such a process is used, the thickness of the light-shielding film is more than 50% greater at the central region of the substrate than at other regions. Thus, the light-shielding film produces a step of large height, making it impossible to obtain a chiral smectic liquid crystal orientation having a good bi-stable orientation.

In order to reduce the height of the step at the surface of the electrode substrate, it has also been proposed to form a light-shielding film from a metal having an excellent light-shielding characteristic with the same thickness as the thickness of the laminate composed of indium oxide film and molybdenum film, e.g., 4000 Å. This type of liquid crystal device exhibits excellent state of orientation of bi-stable chiral smectic liquid crystal due to high degree of flatness, but suffers from a problem in that the driving of the liquid crystal is failed due to short-circuiting between the light-shielding metals which are provided on upper and lower substrates and which serve as electrodes.

SUMMARY OF THE INVENTION

Accordingly, an object of the present invention is to provide a process of producing an electrode substrate with a light-shielding film, which enables formation of an improved state of orientation of a bi-stable chiral smectic liquid crystal.

Another object of the present invention is to provide a chiral smectic liquid crystal panel which realizes a high image contrast.

To this end, according to one aspect of the present invention, there is provided a process for producing an electrode substrate, comprising the steps of: forming a laminate film comprising a transparent conductive film and a metal film on a first side of a transparent substrate; pattern-etching the laminate film so as to form islands of the laminate film in a predetermined pattern; applying a photosensitive anaerobic colored resin on the transparent substrate on which the islands of laminate film are arranged in the predetermined pattern; uniformly exposing the transparent substrate to a light from a second side of the substrate opposite to the first side, in an oxygen-containing atmosphere; removing unexposed portions of the photosensitive anaerobic resin so as to leave the photosensitive anaerobic resin only in the spaces between adjacent islands of the laminate film, for forming a light-shielding film in each of the spaces; and etching the metal film of each laminate film island to remove unnecessary portions of the metal film, for forming metal electrodes wired along edges of the transparent conductive film.

DESCRIPTION OF THE PREFERRED EMBODIMENTS

Figure 1:
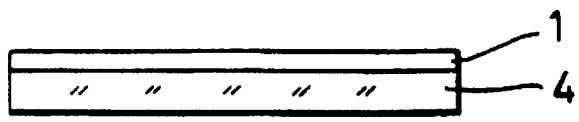
FIGS. 1A to 1G illustrate the steps for forming a light-shielding film in a process according to the invention for producing an electrode substrate.
Figure 1:
Figure 1:
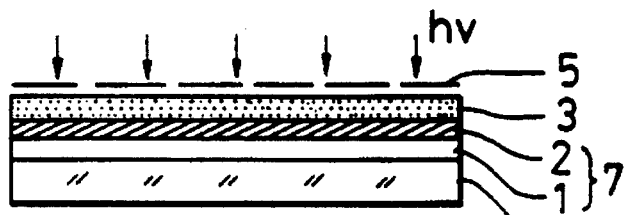
Figure 1:
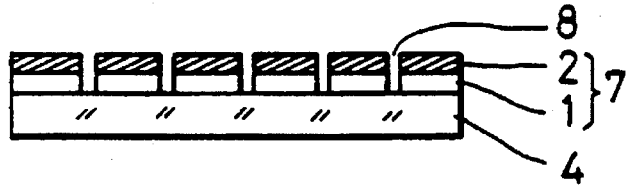
Figure 1:
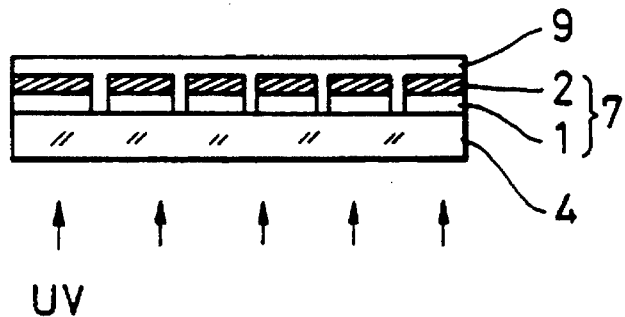
Figure 1:
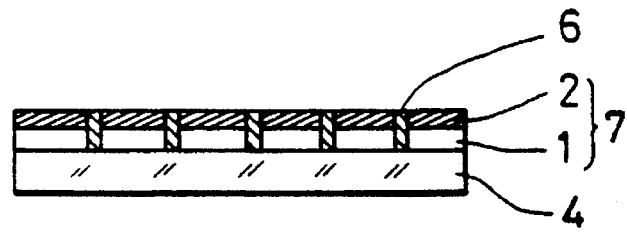
Figure 1:
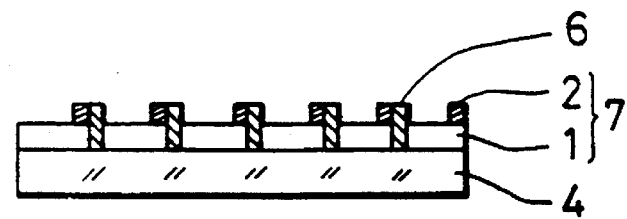

The invention will be described with reference to the accompanying drawings. FIGS. 1A to 1G show an embodiment of the process of the present invention for producing an electrode substrate having a light-shielding film. An indium oxide film 1, as a transparent conductive film which serves as a transparent electrode, is formed on a glass substrate 4 as shown in FIG. 1A. Subsequently, a molybdenum film 2, a metal film which serves as a metal electrode, is formed on the indium oxide film 1, as shown in FIG. 1B. Then, a photo-resist 3 is applied to the laminate film 7 composed of the indium oxide film 1 and the molybdenum film 2, is exposed to light hv through a photo-mask 5, followed by a photo-lithographic process including development and etching, whereby a minute pixel islands of the laminate layer composed of the transparent electrode, metal electrode and the laminate film 7 are formed in a predetermined pattern as shown in FIGS. 1C and 1D. Thus, spaces in each of which a light-shielding layer is to be formed are left between adjacent islands as denoted by 8 in FIG. 1D. Subsequently, a photosensitive anaerobic colored resin 9, which is prepared by dispersing a coloring material in a photosensitive anaerobic resin, is applied to the above-mentioned pattern to a thickness of, for example, 1 μm by spin coating. After a pre-baking of the resin, ultraviolet rays of, for example, 300 mJ/cm$^2$ is uniformly applied to the reverse side of the glass substrate 4 over the entire area thereof, as shown in FIG. 1E. Consequently, the resin is exposed to the ultraviolet rays through the pattern formed on the obverse side of the glass substrate 4 with the molybdenum layer 2 on the indium oxide layer 1 of each island serving as a mask. After the exposure, a developing process is conducted by using a specific developing liquid, whereby a light-shielding film 6 of about 4000 Å thick is formed in each space 8 between adjacent pixel islands, as shown in FIG. 1f. Subsequently, a photo-lithographic process is executed to remove unnecessary portion of molybdenum layer 2 of each effective pixel island, whereby an electrode substrate having a desired electrode pattern is obtained as shown in FIG. 1G. The thickness of the light-shielding film 6 is controllable to, for example, a value substantially the same as the thickness of the laminate 9 composed of the indium oxide film 1 and the molybdenum film 2, by controlling the amount of exposure to the ultraviolet rays.

Figure 5:
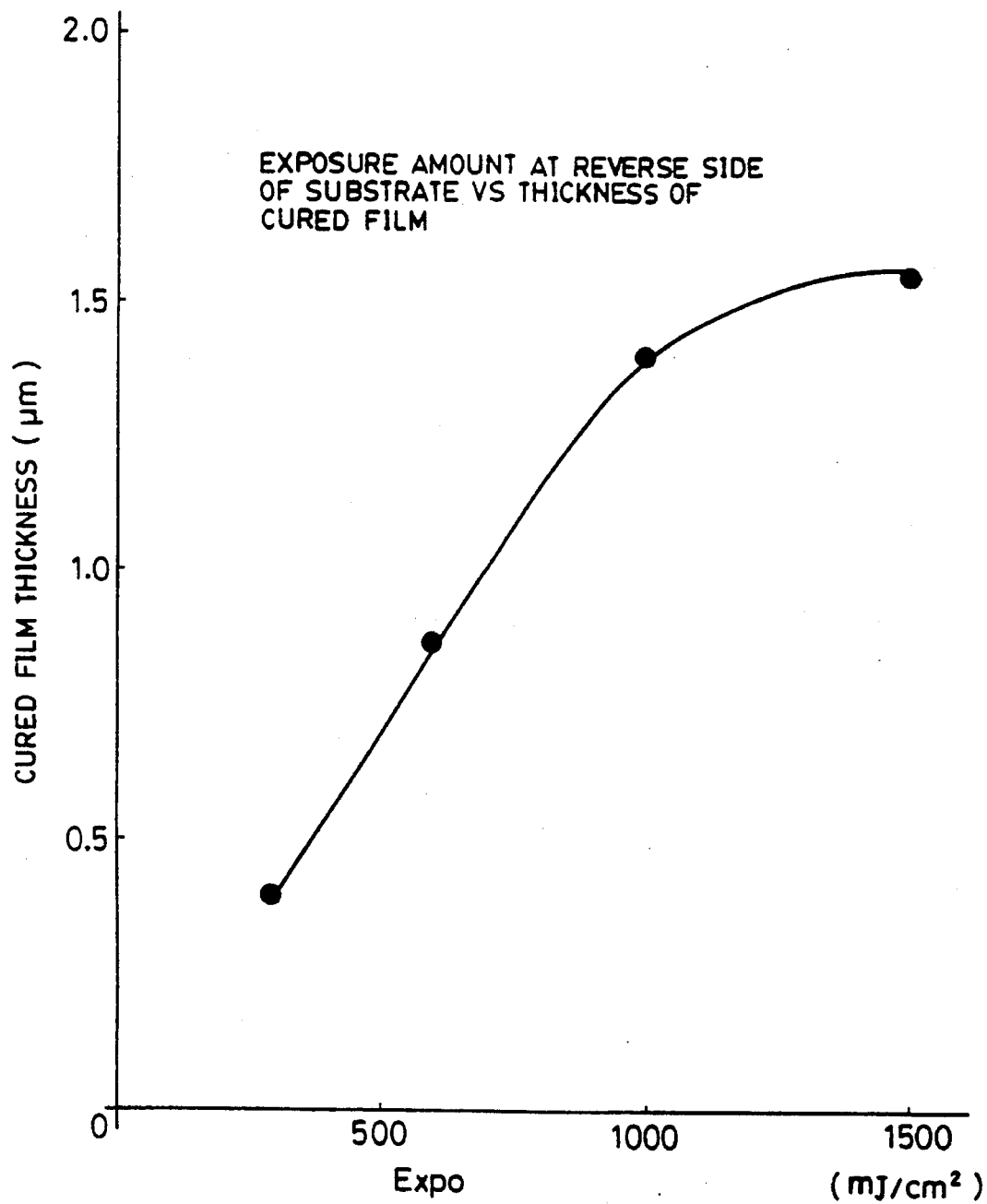
FIG. 5 is a graph showing the relationship between the amount of exposure of a photosensitive anaerobic colored resin used in the invention and the thickness of the film formed by curing of the resin as a result of the exposure.

The photosensitive anaerobic resin used in the present invention is a resin in which photo-polymerization reaction is prohibited when exposed to light in an oxygen atmosphere. In such a resin, $O_2$ is changed into $O_3$ as a result of the exposure to ultraviolet rays; and the $O_3$ thus formed react with photo-polymerizable radicals in the resin so as to prohibit curing. FIG. 5 shows the relationship between the amount of exposure of the photosensitive anaerobic resin and the thickness of the film formed by curing of the resin.

A radical addition-polymerizable unsaturated polymer is preferably used as the photosensitive anaerobic resin in the present invention. A photo-polymerization initiator and a binder are also contained. The radical addition-polymerizable unsaturated monomer has at least one addition-polymerizable ethylene type unsaturated group. Examples of such monomer are polyethylene glycol mono(metha) acrylate, polypropylene glycol mono(metha) acrylate, phenoxy ethyl(metha) acrylate, polyethylene glycol di(metha) acrylate, trimethylolethane tri(metha) acrylate, neopenthyl glycol di(metha) acrylate, pentaerythritol tri(metha) acrylate, and pentaerythritol tetra(metha) acrylate. It is also possible to use an unsaturated polyester, unsaturated polyester acrylate, urethane acrylate, silicone acrylate and epoxy acrylate. The resin is dissolved in a suitable organic solvent such as ethylene glycol, monomethylester, ethylene glycol, monoethylester or propylene glycol so as to be formed into a coating solution. The density of the solution may range between 1 and 50 wt %.

The photo-polymerization initiator used in the invention is 2-benzoylmethylene-3-methyl-β-naphthotiaxzolyn, a vicinal polyketaldonyl compound of the type disclosed in U.S. Pat. No. 2,367,660, an alpha carbonyl compound of the type disclosed in U.S. Pat. No. 2,367,670, acyloin ether disclosed in the U.S. Pat. No. 2,446,828 and an aromatic acyloin compound substituted by alpha hydrocarbon shown in U.S. Pat. No. 2,722,512.

The binder used in the present invention is a linear organic high-molecular polymer which is compatible with the monomer. Preferably, the binder is soluble in organic solvent and can be developed by a weak aqueous solution. Examples of the linear organic high-molecular polymer are a methacrylic acid copolymer, acrylic acid copolymer, itaconic acid copolymer, carboxylic acid copolymer, maleic acid copolymer and partially esterated maleic acid copolymer. An acidic cellulose derivative having a carboxylic acid on the side chain may also be used as the linear organic high-molecular polymer. It is also possible to use substances formed by adding an acid anhydride to a polymer having a hydroxyl group. Among the polymers mentioned above, most suitably used as the binder are benzyl (metha) acrylate/(metha) acrylic acid copolymer, and a multi-copolymer of benzyl (metha) acrylate/(metha) acrylic acid copolymer/other monomer. Water-soluble polymers such as polyvinyl pyrolidone, polyethylene oxide and polyvinyl alcohol are also usable. In order to enhance the strength of the cured film, it is also possible to use an alcohol-soluble nylon or polyether of 2,2-bis-(4-hydroxyphenyl)-propane and epichlorohydrin. The content of such polymer may be determined freely but, from the view point of strength of the image, polymer contents exceeding 90 wt % are not recommended. Preferably, the polymer content ranges between 30 and 85 wt %.

Carbon black and phthalocyanine type pigments are suitably used as the coloring substance in the present invention. The content of the coloring substance preferably ranges between 0.01 and 0.5 weight parts, more preferably between 0.1 and 0.3 weight parts, per 1 weight part of the binder resin solid content.

A 2 μm-thick layer of a photosensitive anaerobic colored resin having the following composition A was formed on a glass substrate and was exposed to ultraviolet rays applied from the reverse side of the glass substrate. After the exposure, a development was conducted with a developing liquid followed by drying, whereby a cured film of the resin was left on the substrate. The relationship between the thickness of the cured film and the amount of exposure (Expo) is shown in FIG. 5.

Resin Composition A

Benzyl methacrylate/methacrylic acid copolymer (binder) 62 g [mol ratio 70/30, mean molecular weight Σw20,000]
Pentaerythritol tetracrylate (monomer) 38 g 2-benzoylmethylene-3-methyl-β-naphthothiazoline (photo-polymerization initiator) 3 g 2-(p-methoxyphenyl)-4,6-bis(trischloromethyl)-s-triazine (anti-thermal polymerization agent) 3 g
Carbon black [e.g., MA-100 of Mitsubishi Kasei] (pigment) 20 g Cellosolve acetate (solvent) 650 g The invention will be more fully understood from the following description of Examples.

EXAMPLE 1

A light-shielding film was formed by a process shown in FIGS. 1A to 1G. As the first step, an oxide indium film of 2500 Å thick was formed on a glass substrate as shown in FIG. 1A. Then, a molybdenum film of 1500 Å thick was formed on the indium oxide film, as shown in FIG. 1B, followed by a patterning with a photo-resist as shown in FIG. 1C. Then, an exposure/development process was executed followed by etching which was conducted by using phosphoric acid-type etching solution for molybdenum and a hydroiodic acid etching solution for indium oxide, so as to remove molybdenum and indium oxide, whereby laminate electrodes corresponding to pixels were formed in a predetermined pattern, in such a manner as to leave, between adjacent pixels, spaces each of which is to be filled by the light-shielding film, as shown in FIG. 1D. Thereafter, the aforementioned resin composition A was applied by spin coating method to a thickness of 1 μm, as shown in FIG. 1E. The structure with the resin composition applied thereto was pre-baked for 3 minutes at 90° C. and ultraviolet rays of 300 mJ/cm$^2$ were applied from the reverse side of the substrate, through the aid of an aligner, thereby exposing the resin to the ultraviolet rays. Thus, the exposure was conducted in a self-aligning manner since the molybdenum films served as masks. The substrate with the exposed resin was subjected to a development which was conducted 60 seconds by using a special developing solution and was then rinsed with water. Subsequently, post-baking was conducted 30 minutes at 200° C., whereby a light-shielding film of 4000 Å thick was formed in each space between adjacent laminate electrodes, i.e., effective pixel portions, as shown in FIG. 1F. Then, a photo-lithographic etching was conducted to remove the metal (molybdenum) of each effective pixel portion, whereby a liquid crystal panel substrate was formed as shown in FIG. 1G.

EXAMPLE 2

FIGS. 2A to 2H show another example of the process for forming the light-shielding film, in which the glass substrate also is etched to provide a greater light-shielding effect of the light-shielding film.

Figure 2:
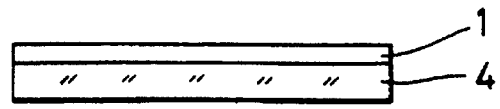
FIGS. 2A to 2H illustrate the steps for forming a light-shielding film according to another embodiment of the process of the invention for producing an electrode substrate.
Figure 2:
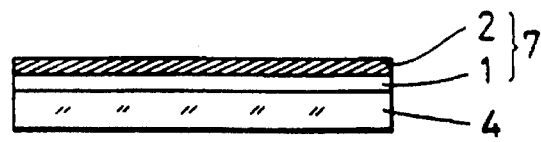
Figure 2:
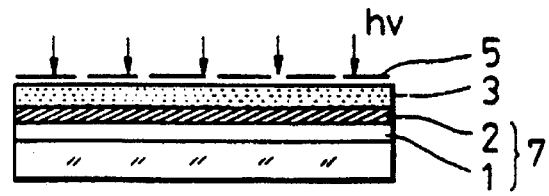
Figure 2:
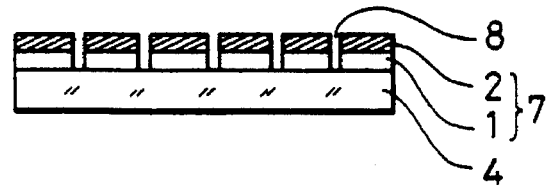
Figure 2:
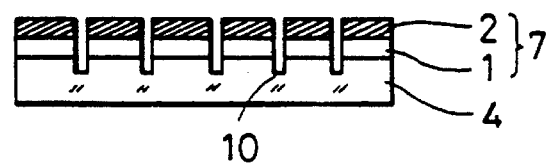
Figure 2:
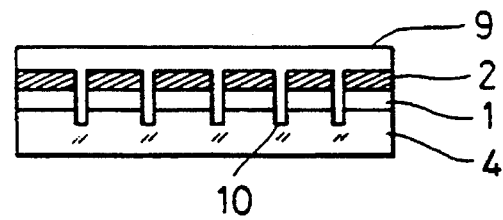
Figure 2:
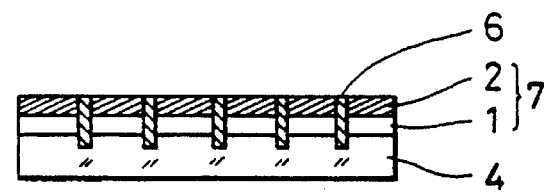
Figure 2:
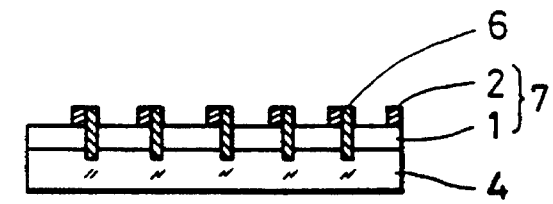
Figure 3:
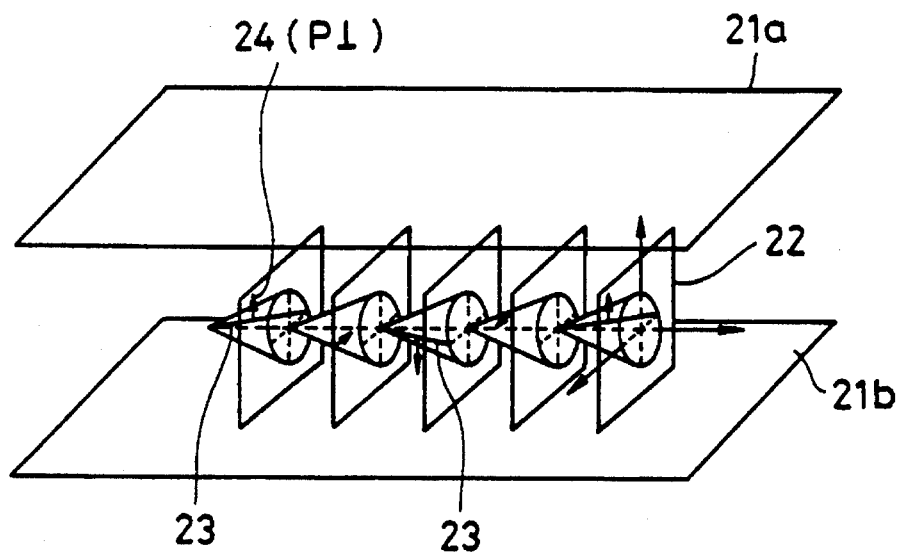
FIGS. 3 and 4 are each schematic perspective views of a liquid crystal device cell explanatory of the operation of a ferroelectric liquid crystal device.

As the first step, an oxide indium film 1 of 2500 Å thick was formed on a glass substrate 4 as shown in FIG. 2A. Then, a molybdenum film 2 of 1500 Å thick was formed on the indium oxide film 1, as shown in FIG. 2B, followed by a patterning with a photo-resist 3 as shown in FIG. 2C. Then, an exposure/development process was executed followed by etching which was conducted by using phosphoric acid-type etching solution for molybdenum and a hydroiodic acid etching solution for indium oxide, so as to remove molybdenum and indium oxide, whereby laminate electrodes corresponding to pixels were formed in a predetermined pattern, in such a manner as to leave, between adjacent pixels, spaces 8 each of which is to be filled by the light-shielding film, as shown in FIG. 2D. Then, the glass substrate 4 was partially etched by fluoric acid at its portions corresponding to the spaces 8 between effective pixel portions, so that grooves 10 of 1 μm depth were formed in the glass substrate 4, as shown in FIG. 2E. Thereafter, the aforementioned resin composition A was applied by spin coating method to a thickness of 2 μm, as shown in FIG. 2F. The structure with the resin composition applied thereto was pre-baked for 3 minutes at 90° C. and ultraviolet rays of 1 J/cm² were applied from the reverse side of the substrate, through the aid of an aligner, thereby exposing the resin to the ultraviolet rays. Thus, the exposure was conducted in a self-aligning manner since the molybdenum films served as masks. The exposure to 1 J/cm² ultraviolet rays caused the resin to be cured by a depth of 1.4 μm. The substrate with the exposed resin was subjected to a development which was conducted 60 seconds by using a special developing solution and was then rinsed with water. Subsequently, post-baking was conducted 30 minutes at 200° C., whereby a light-shielding film of 14000 Å thick was formed in each space between adjacent laminate electrodes, i.e., effective pixel portions, as shown in FIG. 2G. Then, a photo-lithographic etching was conducted to remove the metal (molybdenum) of each effective pixel portion, whereby a liquid crystal panel substrate was formed as shown in FIG. 2H.

Figure 4:
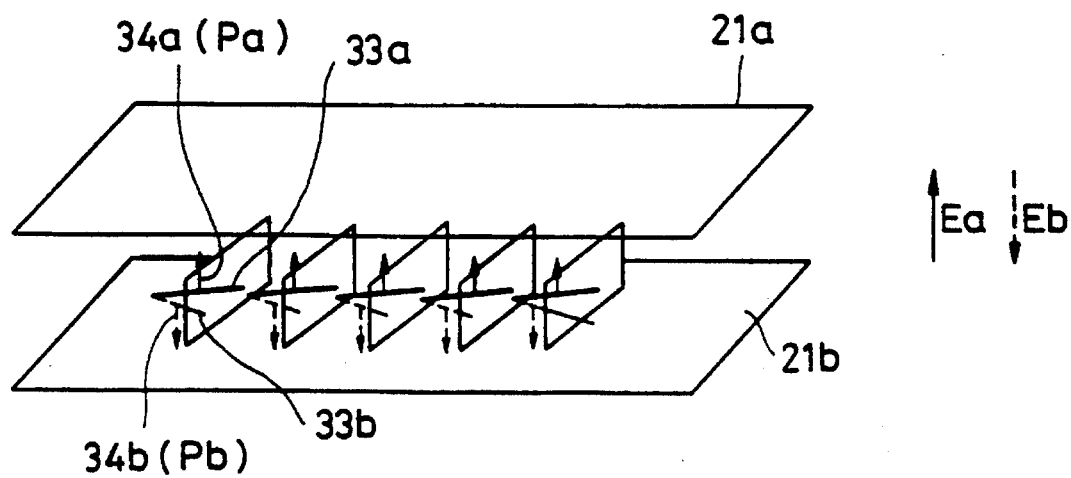

A bi-stable chiral smectic liquid crystal element was produced by using the above-mentioned liquid crystal panel as the substrate 21a shown in FIG. 4.

As will be understood from the foregoing description, the process of the present invention can form, in each of the spaces between adjacent pixel portions of a liquid crystal device such as a liquid crystal display or a liquid crystal-optical shutter device, a thin light-shielding layer from a photosensitive anaerobic colored resin, with a high degree of uniformity of thickness which is controllable by adjusting the rate of ultraviolet exposure and without necessitating oxygen shielding film which heretofore has been necessary in order to promote curing of the resin.

In particular, a delicate thickness control of the light-shielding film is possible through the control of the exposure rate, thus enabling formation of an extremely small thickness of 4000 Å with a high degree of uniformity. In addition, heights of steps on the electrode substrate are remarkably reduced to ensure a good state of orientation of the liquid crystal molecules, thus improving contrast of image on the liquid crystal display.

Furthermore, the light-shielding film, which is electrically insulating, prevents occurrence of short-circuiting between electrodes on upper and lower substrates which tends to occur in known liquid crystal devices which employ light-shielding metals serving also as the electrodes.

What is claimed is:

1. A chiral smectic liquid crystal device comprising:
    an electrode substrate including:
    a substrate portion having an upper substrate surface;
    a plurality of laminate films on said substrate surface spaced to define a plurality of respective spaces on said substrate surface therebetween, each said laminate film including a first layer of a transparent conductive film having a first surface area and a second layer of a non-transparent metal film on and along an edge portion of said first surface area to leave a remaining portion of said first surface area exposed, each said remaining portion defining a pixel area and each said metal film having an upper metal surface; and
    a respective light shielding film filling each of said spaces and extending upwards from said substrate surface to have an upper film surface continuous with and coplanar with the upper metal surface of the metal film of the respective laminate film, a thickness of each said light shielding film being less than 1 μm as measured from said substrate surface to the respective upper metal surface, such that all surface areas of said electrode substrate between said pixel areas are substantially shielded from light by said metal films and said light shielding films.

2. A device according to claim 1, wherein said light shielding films are formed by exposing a colored resin, comprising a photosensitive anaerobic resin and a coloring substance, to an oxygen-containing atmosphere for an amount of exposure controlled to prohibit the colored resin from curing.

3. A device according to claim 1, wherein the thickness of said light shielding films from the substrate surface is 4000 Å.

4. A chiral smectic liquid crystal device comprising:
    an electrode substrate including:
    a substrate portion having an upper substrate surface;
    a plurality of laminate films on said substrate surface spaced to define a plurality of respective spaces on said substrate surface therebetween, each said laminate film including a first layer of a transparent conductive film having a first surface area and a second layer of a non-transparent metal film on and along an edge portion of said first surface area to leave a remaining portion of said first surface area exposed, each said remaining portion defining a pixel area, each said metal film having an upper metal surface, and each said space having a respective upwardly open groove extending below said substrate surface; and
    a respective light shielding film filling each of said spaces and the respective grooves therein and extending upwards from said substrate surface to have an upper film surface continuous with and coplanar with the upper metal surface of the metal film of the respective laminate film, a thickness of each said light shielding film being less than 1 μm as measured from said substrate surface to the respective upper metal surface, such that all surface areas of said electrode substrate between said pixel areas are substantially shielded from light by said metal films and said light shielding films.

5. A device according to claim 4, wherein said light shielding films are formed by exposing a colored resin, comprising a photosensitive anaerobic resin and a coloring substance, to an oxygen-containing atmosphere for an amount of exposure controlled to prohibit the colored resin from curing.

6. A device according to claim 4, wherein the thickness of said light shielding films from the substrate surface is 4000 Å.

* * * * *

UNITED STATES PATENT AND TRADEMARK OFFICE
CERTIFICATE OF CORRECTION

PATENT NO. : 5,568,291
DATED : October 22, 1996
INVENTOR(S) : MURATA ET AL.

It is certified that error appears in the above-indentified patent and that said Letters Patent is hereby corrected as shown below:

TITLE PAGE

AT [56] REFERENCES CITED, FOREIGN PATENT DOCUMENTS

"5040317" should read --50-40317--.

AT [73] ASSIGNEE

"Cannon Kabushiki Kaisha" should read --Canon Kabushiki Kaisha--.

COLUMN 1

Line 8, "2," should read --26,--.

COLUMN 3

Line 65, "1A to 1G" should read --1(a) to 1(g)--.

COLUMN 4

Line 1, "2A to 2H" should read --2(a) to 2(h)--.
Line 17, "1A to 1G" should read --1(a) to 1(g)--.
Line 19, "as" should be deleted.
Line 21, "1A." should read --1(a).--.
Line 23, "1B." should read --1(b).--.
Line 25, "is" should read --and--.
Line 28, "a" should be delected.
Line 31, "1C and 1D." should read --1(c) and 1(d).--
Line 33, "1D." should read --1(d).--.
Line 39, "is" should read --are--.

UNITED STATES PATENT AND TRADEMARK OFFICE
CERTIFICATE OF CORRECTION

PATENT NO. : 5,568,291
DATED : October 22, 1996
INVENTOR(S) : MURATA ET AL.

Page 2 of 4

It is certified that error appears in the above-indentified patent and that said Letters Patent is hereby corrected as shown below:

COLUMN 4 (cont'd)

Line 40, "1E." should read --1(e).--.
Line 48, "1f." should read --1(f).--.
Line 52, "1G." should read --1(g).--.
Line 63, "react" should read --reacts--.

COLUMN 5

Line 49, "view point" should read --viewpoint--.
Line 51, "bly,the" should read --bly, the--.

COLUMN 6

Line 4, "Pentaerythritol" should read --¶ Pentaerythritol-- and "2-benzoylmeth-" should read --¶ 2-benzoylmeth---.
Line 6, "2-(p-methoxyphenyl)" should read --¶ 2-(p-methoxyphenyl)--.
Line 8, "Carbon" should read --¶ Carbon--.
Line 9, "Cellosolve" should read --¶ Cellosolve--.
Line 16, "1A to 1G." should read --1(a) to 1(g).--.
Line 18, "1A." should read --1(a).--.
Line 19, "1B," should read --1(b),--.
Line 21, "1C." should read --1(c).--.
Line 29, "1D." should read --1(d).--.
Line 31, "1E." should read --1(e).--
Line 44, "1F." should read --1(f).--

UNITED STATES PATENT AND TRADEMARK OFFICE
CERTIFICATE OF CORRECTION

PATENT NO. : 5,568,291
DATED : October 22, 1996
INVENTOR(S) : MURATA ET AL.

It is certified that error appears in the above-indentified patent and that said Letters Patent is hereby corrected as shown below:

COLUMN 6 (cont'd)

```
Line 48, "1G." should read --(1g).--.
Line 51, "2A to 2H" should read --2(a) to 2(h)--.
Line 56, "2A." should read --2(a).--.
Line 59, "2B," should read --2(b),--.
Line 60, "2C." should read --2(c).--.
```

COLUMN 7

```
Line 2,  "2D." should read --2(c).--.
Line 6,  "2E." should read --2(e).--.
Line 8,  "2F." should read --2(f).--.
Line 23, "2G." should read --2(g).--.
```

UNITED STATES PATENT AND TRADEMARK OFFICE
CERTIFICATE OF CORRECTION

PATENT NO. : 5,568,291
DATED : October 22, 1996
INVENTOR(S) : MURATA ET AL.

Page 4 of 4

It is certified that error appears in the above-indentified patent and that said Letters Patent is hereby corrected as shown below:

COLUMN 7 (cont'd)

Line 26, "2H." should read --2(h).--.

Signed and Sealed this

Eighteenth Day of March, 1997

Attest:

BRUCE LEHMAN

*Attesting Officer*    Commissioner of Patents and Trademarks